(12) United States Patent
Ashida

(10) Patent No.: US 7,706,900 B2
(45) Date of Patent: Apr. 27, 2010

(54) CONTROL APPARATUS WITH FAST I/O FUNCTION, AND CONTROL METHOD FOR CONTROL DATA THEREOF

(75) Inventor: Kazuhide Ashida, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 483 days.

(21) Appl. No.: 11/782,271

(22) Filed: Jul. 24, 2007

(65) Prior Publication Data

US 2008/0046103 A1 Feb. 21, 2008

(30) Foreign Application Priority Data

Aug. 21, 2006 (JP) .............................. 2006-224409

(51) Int. Cl.
*G05B 19/04* (2006.01)

(52) U.S. Cl. ........................................ 700/86; 711/159

(58) Field of Classification Search ..................... 700/3, 700/5, 23, 86; 710/20, 52, 65; 711/3, 103, 711/137, 154, 159; 712/27, 207, 218; 365/185.11
See application file for complete search history.

(56) References Cited

U.S. PATENT DOCUMENTS

| | | | | | |
|---|---|---|---|---|---|
| 3,766,527 | A | * | 10/1973 | Briley | 712/207 |
| 5,787,484 | A | * | 7/1998 | Norman | 711/159 |
| 6,327,203 | B1 | * | 12/2001 | Won | 365/205 |
| 6,438,665 | B2 | * | 8/2002 | Norman | 711/159 |
| 6,677,954 | B1 | * | 1/2004 | Jensen et al. | 345/531 |
| 7,000,064 | B2 | * | 2/2006 | Payne et al. | 711/103 |
| 7,298,642 | B2 | * | 11/2007 | Ise | 365/158 |
| 7,486,530 | B2 | * | 2/2009 | Hartono et al. | 365/49.1 |
| 7,496,710 | B1 | * | 2/2009 | Venkatrao | 711/117 |
| 7,532,511 | B2 | * | 5/2009 | Conley et al. | 365/185.11 |
| 7,568,082 | B2 | * | 7/2009 | Hoogerbrugge | 711/170 |
| 7,580,273 | B2 | * | 8/2009 | Rao | 365/63 |
| 2007/0070671 | A1 | * | 3/2007 | Richter | 365/52 |

FOREIGN PATENT DOCUMENTS

JP     2001023375 A  *  1/2001

* cited by examiner

*Primary Examiner*—Albert DeCady
*Assistant Examiner*—Dave Robertson
(74) *Attorney, Agent, or Firm*—Oblon, Spivak, McClelland, Maier & Neustadt, L.L.P.

(57) ABSTRACT

A control apparatus with a fast I/O function is adapted for storage of a control program, and to input a status of a target to be controlled as an input data from an I/O device, follow the control program to execute an operation of the input data, and output to the I/O device a result of the operation as an output data for controlling the target to be controlled, and includes a batch I/O buffer memory 201 having an output data register for storing an output data of the I/O device, and a batch I/O buffer memory controller 203 for controlling a writing of output data to be written to the batch I/O buffer memory 201, the batch I/O buffer memory controller 203 being adapted to control the writing of output data to the batch I/O buffer memory in accordance with a comparison output of control data of a control program executing circuit 14.

5 Claims, 17 Drawing Sheets

FIG. 8

ACTIONS OF I/O REGISTER, CHANGE FLAG, AND I/O BUFFER MEMORY ADDRESS STORAGE AREA REGISTER

| COINCIDENCE SIGNAL | I/O REGISTER | CHANGE FLAG REGISTER | I/O BUFFER MEMORY ADDRESS STORAGE AREA REGISTER |
|---|---|---|---|
| "0" (OFF) | WRITE ACTION | WRITE "1" | WRITE ADDRESS OUTPUT BY ADDRESS CONTROL CIRCUIT |
| "1" (ON) | NOP | NOP | NOP |

FIG. 9

ACTIONS OF BATCH I/O BUFFER MEMORY

| COINCIDENCE SIGNAL | CHANGE FLAG | OUTPUT REGISTER ADDRESS STORAGE AREA | OUTPUT REGISTER DATA STORAGE AREA |
|---|---|---|---|
| "0" (OFF) | 0 | WRITE ADDRESS PREPARED ANEW BY ADDRESS CONTROL CIRCUIT | WRITE RESULT OF OPERATION PROCESS FROM CONTROL PROGRAM EXECUTING CIRCUIT |
| "0" (OFF) | 1 | OUTPUT ADDRESS STORED IN BATCH I/O BUFFER MEMORY ADDRESS STORAGE AREA TO ADDRESS CONTROL CIRCUIT | WRITE RESULT OF OPERATION PROCESS FROM CONTROL PROGRAM EXECUTING CIRCUIT |
| "1" (ON) | 0 | NO WRITE EXECUTION, AND ADDRESS IS INVALID | NO WRITE EXECUTION, AND DATA IS INVALID |
| "1" (ON) | 1 | NO WRITE EXECUTION, AND ADDRESS IS INVALID | NO WRITE EXECUTION, AND DATA IS INVALID |

FIG. 10
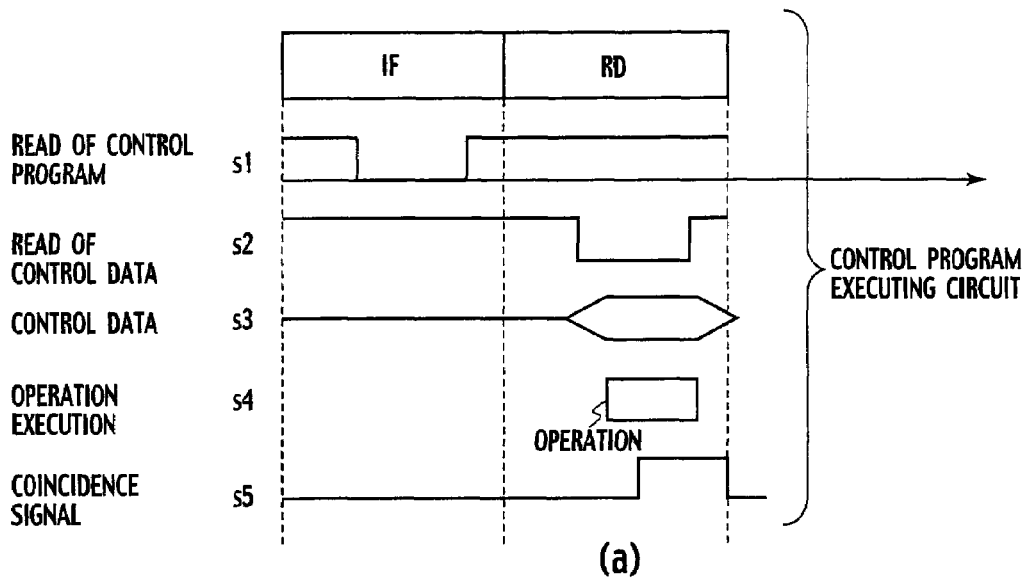
(a)
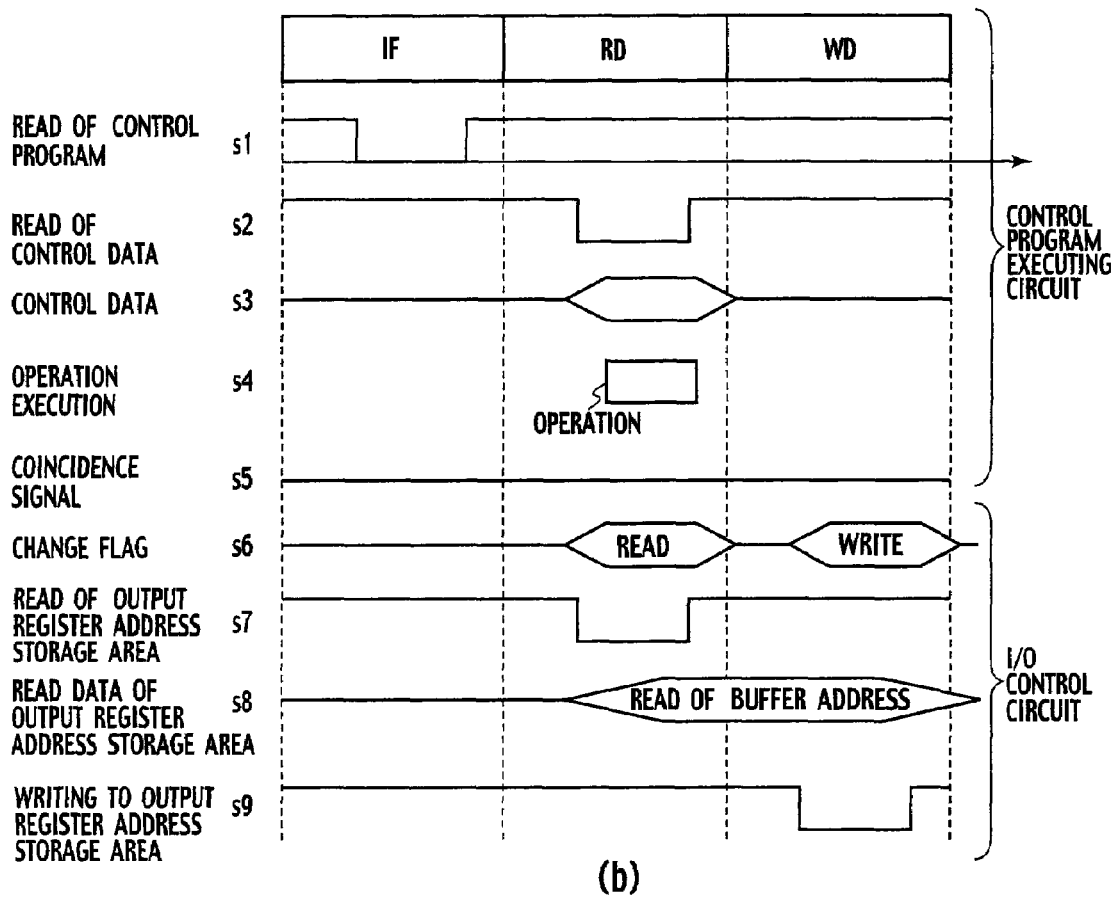
(b)

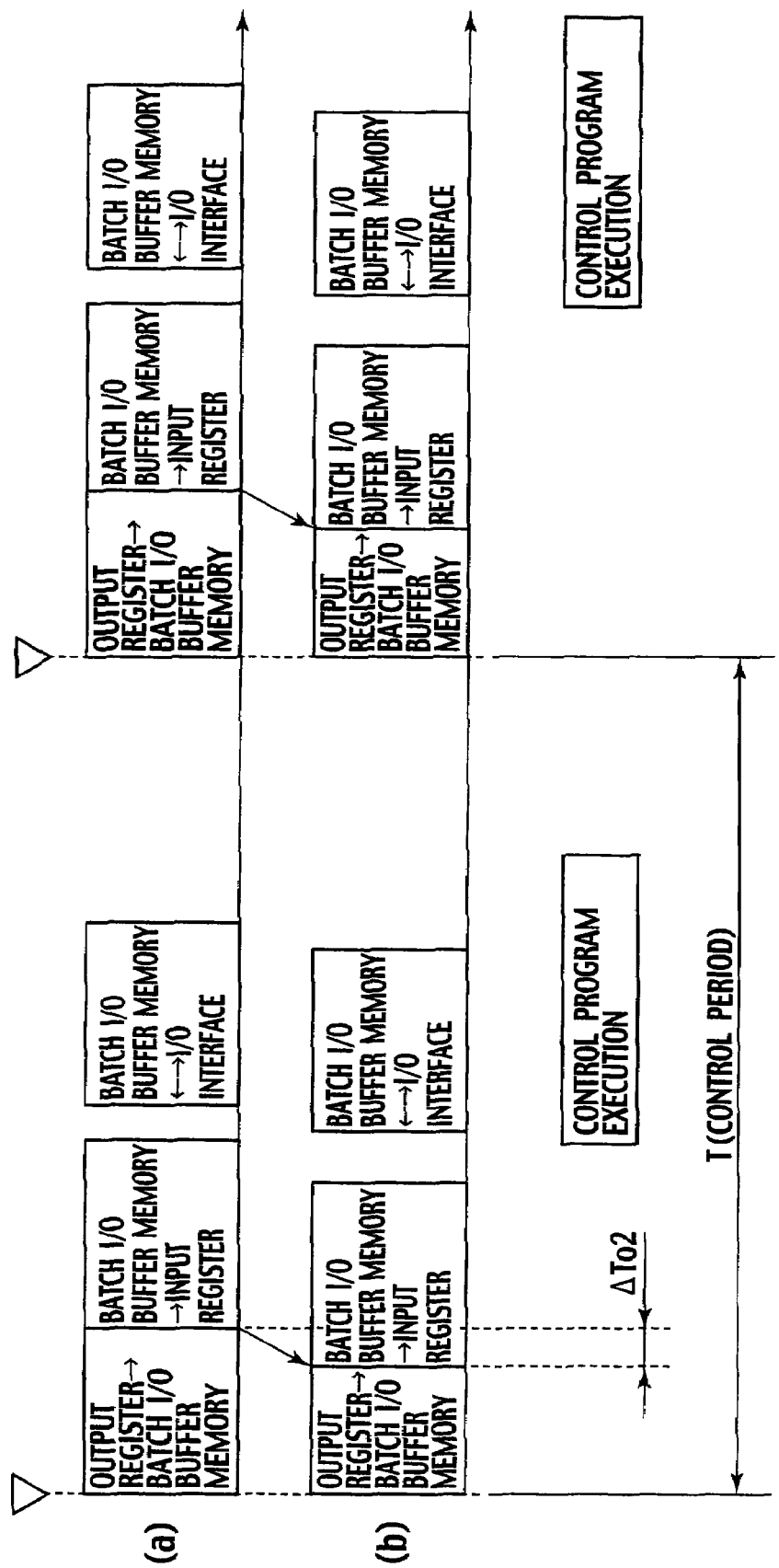

CONTROL APPARATUS WITH FAST I/O FUNCTION, AND CONTROL METHOD FOR CONTROL DATA THEREOF

CROSS REFERENCE TO RELATED APPLICATION

The present application claims the benefit of priority under 35 U.S.C. §119 to Japanese Patent Application No. 2006-224409, filed on Aug. 21, 2006, the entire contents of which are incorporated herein by reference.

BACKGROUND OF THE INVENTION

1. Field of Art

The present invention relates to a control apparatus that has wide applications to controls in iron and steel plants, and paper manufacturing plants, as well as for industrial systems, such as in the automobile industry, and public systems encompassing water supply and sewerage systems.

2. Description of Relevant Art

FIG. 1 shows configuration of a conventional control apparatus 100. In the control apparatus 100, a control program executing circuit 114 is adapted to process input data from a plurality of I/O (input/output) devices 200, which data are input via I/O interfaces 117 and a system bus 119 to input registers in a control data memory 116, where the input data are used for implementation of a control program stored in a control program memory 115 to be executed in the control program executing circuit 114, of which operation results are written to unshown output registers in the control data memory 116.

FIG. 2 shows associated data flows. For this, before the execution of operations of the control program, input data from input devices 200, as the whole, are input from the input devices 200 to the input registers 116a, and after the execution of operations of the control program, whole data stored in the output registers 116b are output to the I/O devices. This process is referred to as a batch I/O.

Therefore, whole input data are input to the input registers 116a even if input data from the input devices 200 include no variations, and whole data stored in the output registers 116b are output to the I/O devices 200 even if output data include no variations.

The control apparatus 100 has for the I/O devices 200 a total number of I/O connections about 1000 even for systems of an intermediate scale, thus taking much time for the batch I/O, unsuccessfully achieving a shortened control period.

To this point, there has been disclosed a programmable controller (refer to e.g. Japanese Patent Publication No. 3317601) for data transfer along a batch I/O between I/O devices and I/O registers in a control apparatus, that includes, when executing a control program, monitoring operands of specific sequence instructions, and discriminating a state of execution of CPU, to set up flags of an instruction for data transfer on I/O registers needing data transfer, and when making data transfer between those I/O registers and I/O modules, executing data transfer to I/O modules with respect simply to I/O registers having data transfer instruction flags set thereon, allowing for a minimized data transfer rate, as necessary.

The above-mentioned programmable controller reads whole I/O registers to check status of their transfer instruction flags. This disables reduction of the time required for checks of transfer instruction flags on I/O registers needing no checks, as a problem.

Further, in the case of a read/write instruction for reading a control data from a control data memory and writing-back a result of an operation process executed thereon to the control data memory, the programmable controller writes the result to the control data memory unconditionally even if the result of operation is identical to the read control data. This operation prevents from achieving omission of unnecessary writing, as a problem.

SUMMARY OF THE INVENTION

The present invention has been achieved to solve the problems described, and has it as an object to provide a control apparatus with a fast I/O function in which, without checking whole I/O registers, simply those input data changed from previous inputs are taken into input registers, and simply those data changed from previous output data, as a result of execution of an operation of a control program, are output from output registers to I/O devices, thereby allowing for a shortened time for data transfer in a batch I/O of input data and output data between a control apparatus and I/O devices.

It also is an object of the present invention to provide a control method for control data of a control apparatus with a fast I/O function in which for every read and write instruction that has a result of operation identical to a control data read from a control data memory, the execution of an instruction of write phase is stopped so as not to write the control data, thereby allowing for a shortened time for control operations in a batch I/O.

To achieve the object described, according to a first aspect of the present invention, a control apparatus with a fast I/O function is adapted for storage of a control program, and to input a status of a target to be controlled as an input data from an I/O device, follow the control program to execute an operation of the input data, and output to the I/O device a result of the operation as an output data for controlling the target to be controlled, and comprises a control program execution unit for controlling the target to be controlled, an I/O data interface for having the input data and the output data input to the control apparatus and output to the I/O device, and a system bus for interconnection between the control program execution unit and the I/O data interface, the control program execution unit comprising a control program memory adapted for storage of the control program, a control data memory adapted for temporary storage of the input data, the output data, and a control variable, and a control program executing circuit adapted for execution of the control program by using the input data to be stored in the control data memory, the control program executing circuit comprising an instruction register for storing an instruction read from the control program memory, a decoder for interpreting the instruction stored in the instruction register, a control data storage register for storing a content of an operand read from the control data memory, an operation unit for operating a control data stored in the control data storage register in accordance with the instruction interpreted by the decoder, a register for storing an operation output of the operation unit, a control data comparator for detecting whether or not a coincidence is found between the control data before operation by the operation unit and a data after execution of operation, and an operation controller adapted for controls to have the operand read from the control data memory to the control data storage register, and an output data from the operation unit written in the control data memory in accordance with an output of the control data comparator, wherein a write phase of a read and write instruction is omitted if a coincidence signal is output from the control data comparator, and otherwise an entirety of the read and write instruction is executed.

To achieve the object described, according to a second aspect of the present invention, in the control apparatus with a fast I/O function according to the first aspect, the I/O data interface comprises a batch I/O buffer memory having an I/O data register adapted for storage of an output data of the I/O device, and a batch I/O buffer memory controller for a control of writing to the batch I/O buffer memory, the batch I/O buffer memory controller being adapted, if the coincidence signal is output from the control data comparator of the control program executing circuit, then to stop writing an output data of the control data memory to the batch I/O buffer memory, and otherwise to allow the writing to the batch I/O buffer memory.

To achieve the object described, according to a third aspect of the present invention, in the control apparatus with a fast I/O function according to the first aspect, the I/O data interface comprises a combination of a first buffer memory and a second buffer memory adapted for alternate storage of an input data read from the I/O device in a current control period or a previous control period, an input data comparator adapted for comparison between an input data to be stored in the first buffer memory and an input data stored in the second buffer memory, and an input data controller adapted, if a coincidence output is given by the input data comparator, then to provide an instruction not to write the input data in the current control period to the control data memory, and otherwise to provide an instruction to write.

According to a fourth aspect of the present invention, in the control apparatus with a fast I/O function according to the third aspect, the input data controller comprises an address converter for converting an address of the input data to a write address of an input register of the control data memory.

To achieve the object described, according to a fifth aspect of the present invention, in the control apparatus with a fast I/O function according to the first aspect, the I/O data interface comprises the control data memory having a combination of a first output register and a second output register adapted for storage of an output data read in a current control period or a previous control period to be output to the I/O device, a output data comparator adapted for comparison between an output data stored in the first output register and an output data stored in the second output register, an output buffer memory adapted for storage of an output data to be output to the I/O device, and an output data controller adapted, if a coincidence output is given by the output data comparator, then to provide an instruction not to write the output data in the current control period to the output buffer memory, and otherwise to provide an instruction to write.

To achieve the object described, according to a sixth aspect of the present invention, for control data of a control apparatus with a fast I/O function being adapted for storage of a control program, and to input a status of a target to be controlled as an input data from an I/O device, follow the control program to execute an operation of the input data, and output to the I/O device a result of the operation as an output data for controlling the target to be controlled, a control method comprises the steps of judging whether or not control data before and after execution of the operation is coincident with each other, providing an instruction to stop execution of a write phase of a read and write instruction if a coincidence is judged, and otherwise providing an instruction of execution of the write phase of the read and write instruction after execution of the operation.

BRIEF DESCRIPTION OF THE DRAWINGS

FIG. 8 is an explanatory diagram of signals of control actions according to the second embodiment of the present invention.

FIG. 9 is an explanatory diagram of control actions according to the second embodiment of the present invention.

FIG. 10 is an explanatory diagram of control actions according to the second embodiment of the present invention.

FIG. 17 is an explanatory diagram of effects of control actions according to the fourth embodiment of the present invention.

DETAILED DESCRIPTION OF THE EMBODIMENTS

Figure 1:
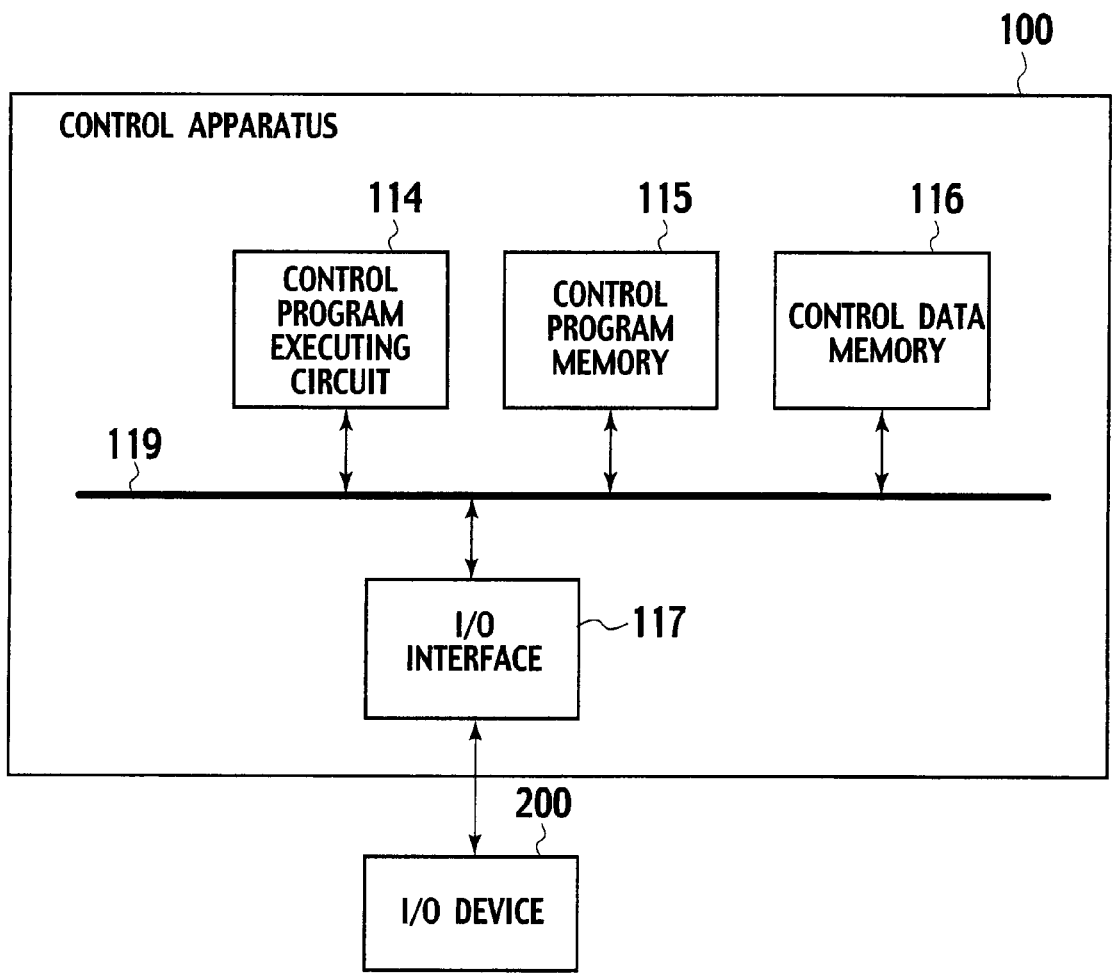
FIG. 1 is a configuration diagram of a conventional control apparatus.
Figure 2:
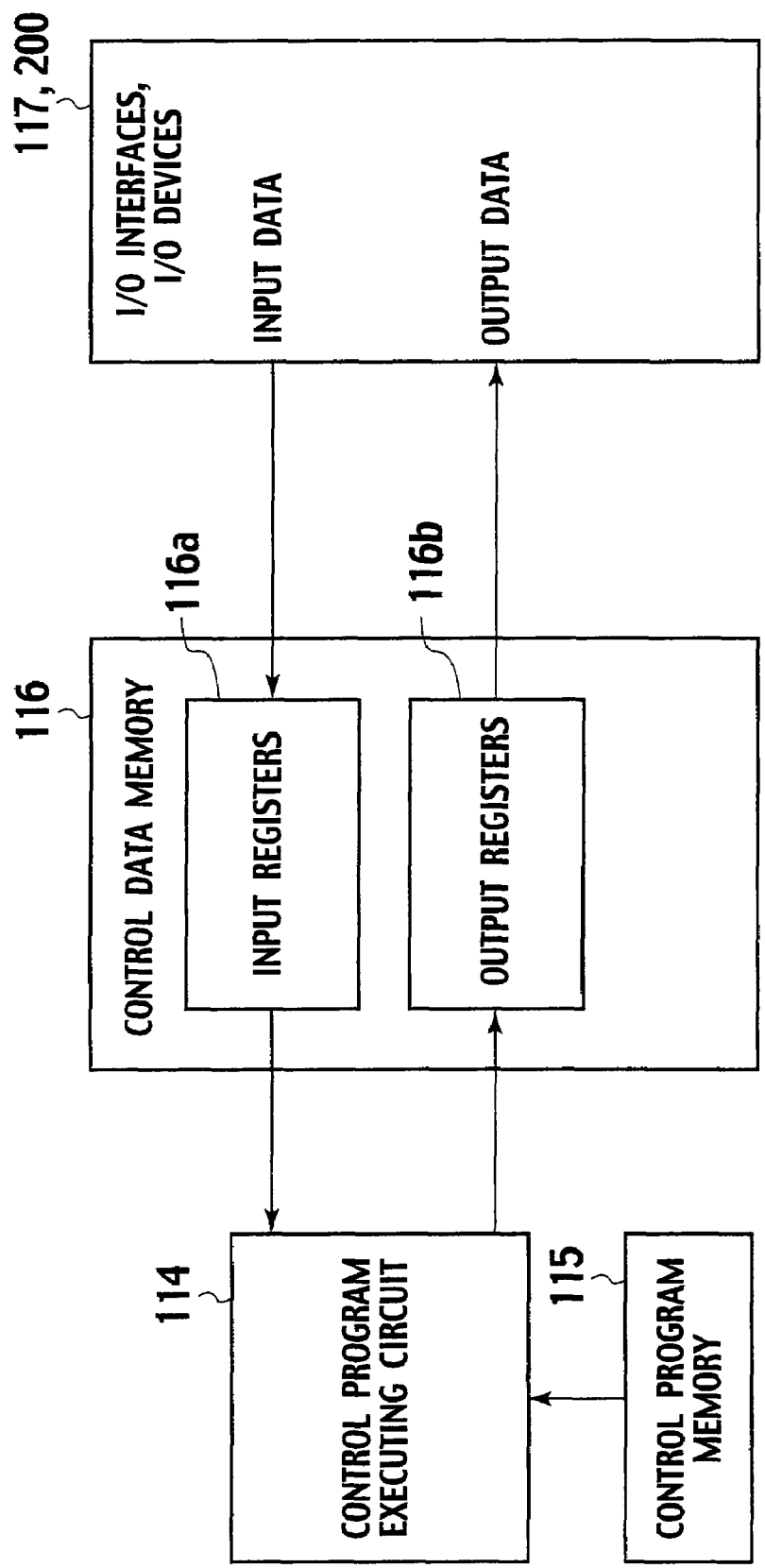
FIG. 2 is an explanatory diagram of flows of data in a conventional batch I/O.

There will be described below embodiments of the present invention, with reference to the accompanying drawings. Like elements are designated by like reference characters.

First Embodiment

Figure 3:
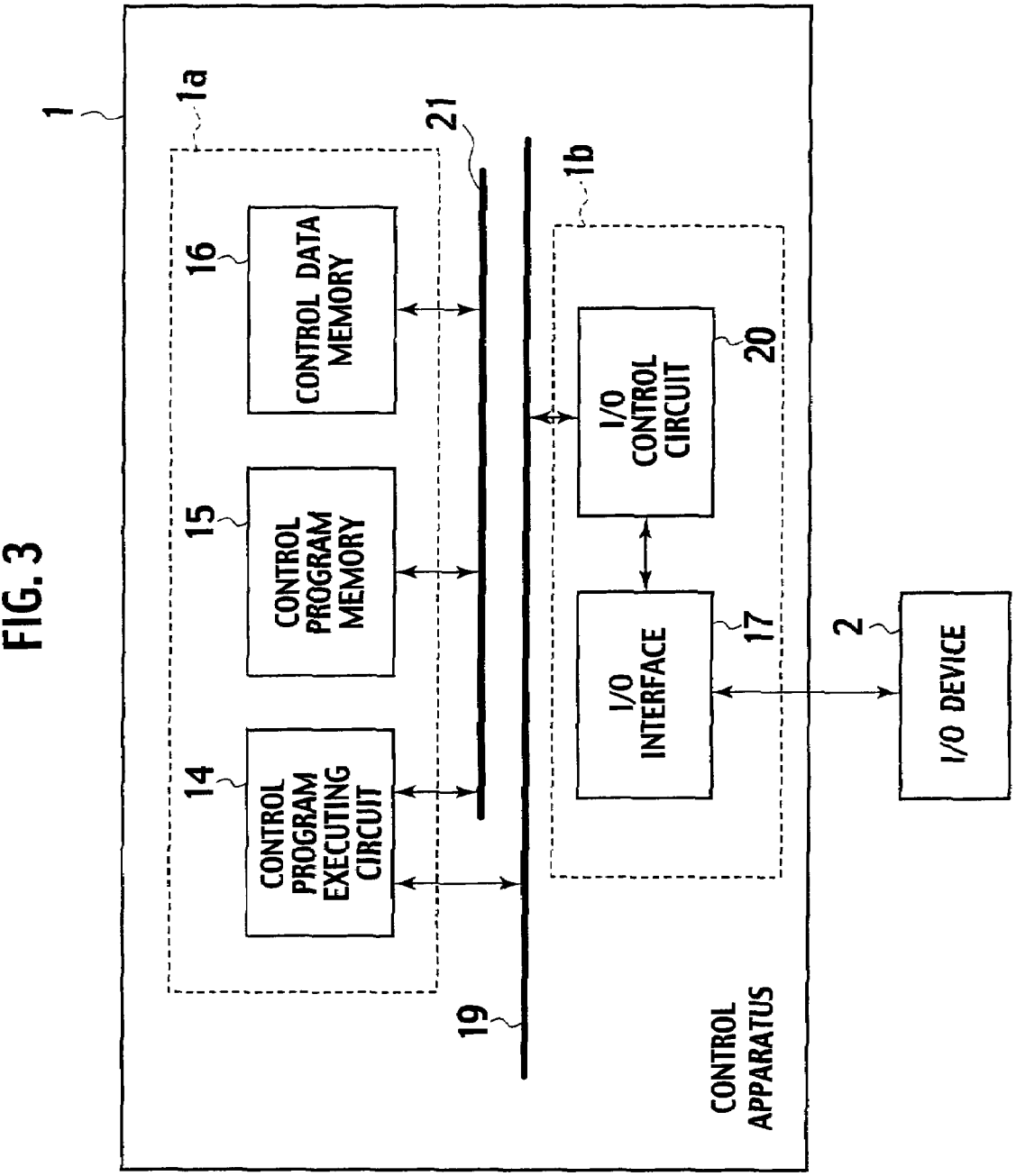
FIG. 3 is a configuration diagram of a control apparatus with a fast I/O function according to the present invention.
Figure 4:
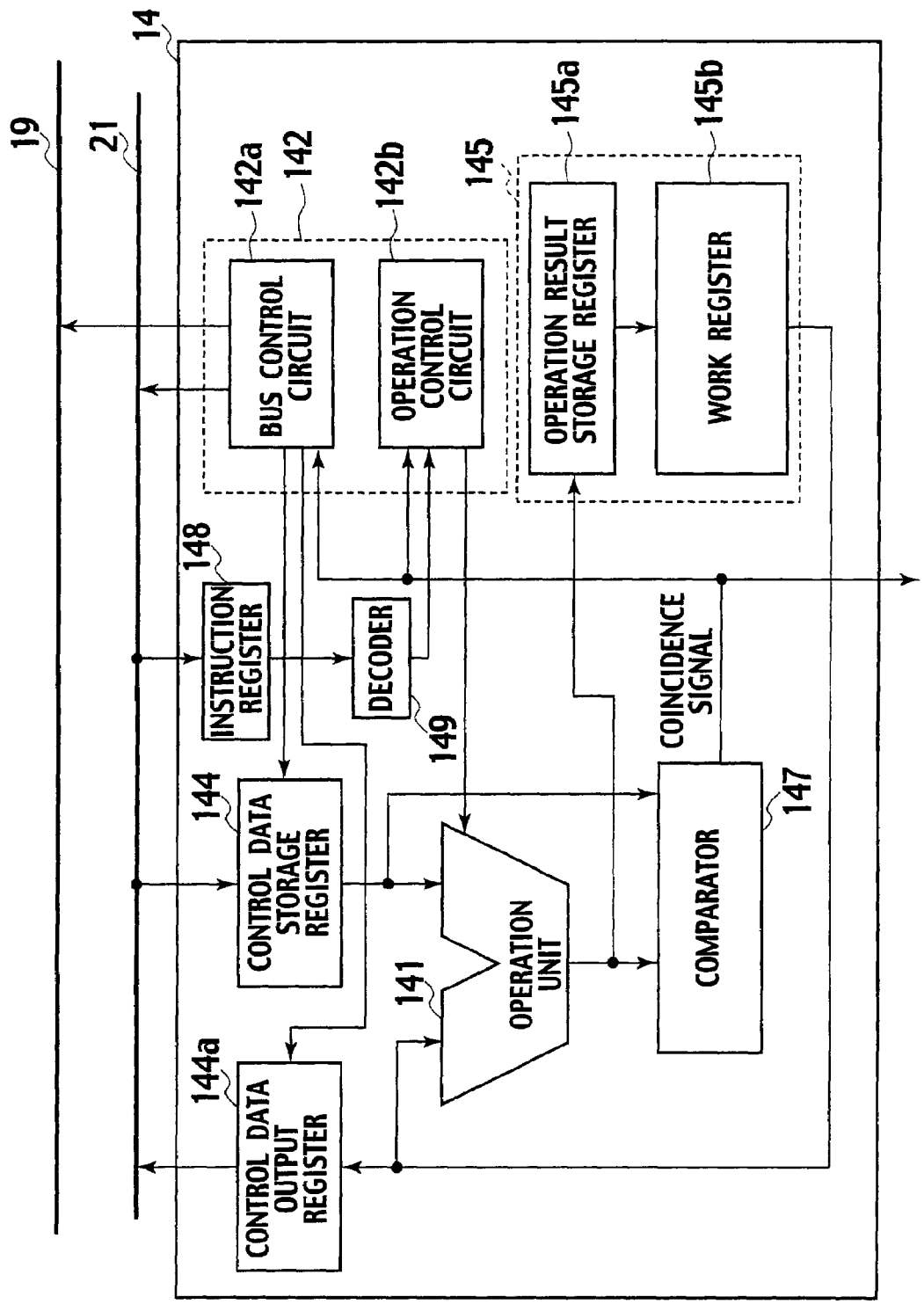
FIG. 4 is a detailed configuration diagram of a control program executing circuit according to a first embodiment of the present invention.
Figure 5:
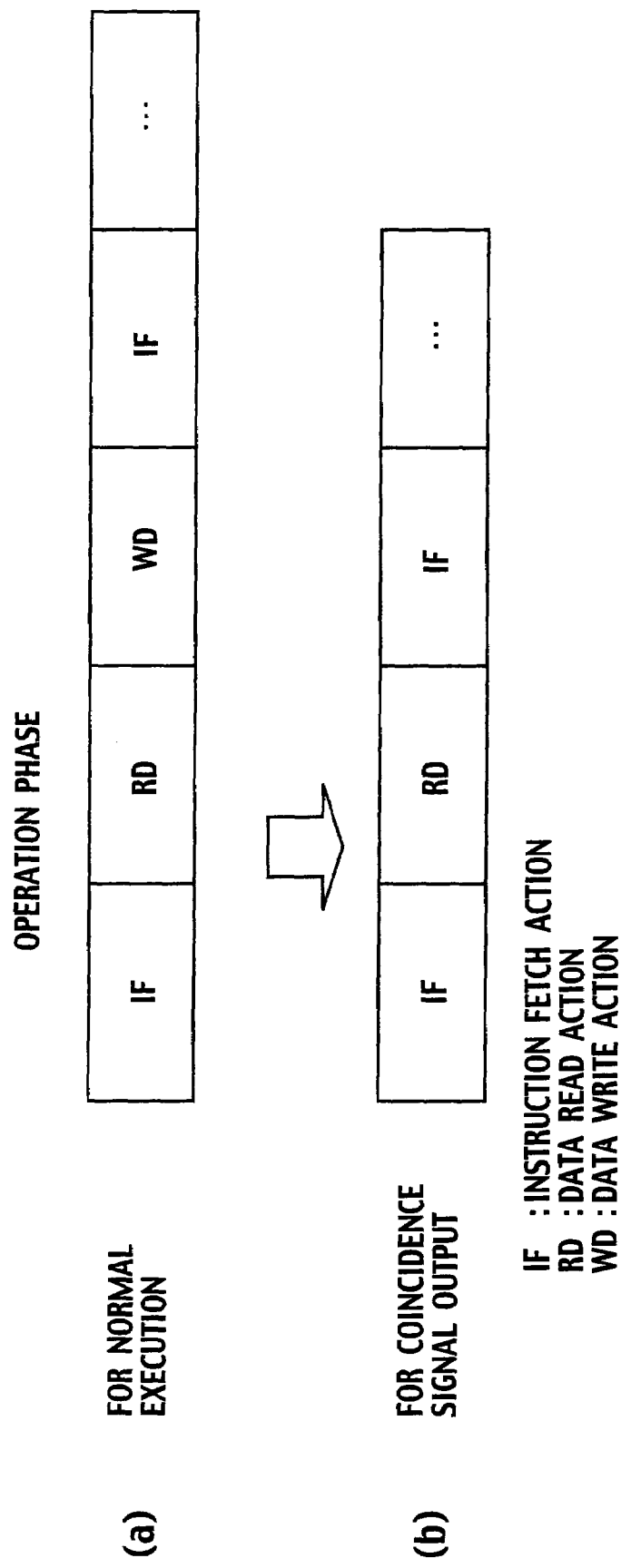
FIG. 5 is an explanatory diagram of actions when outputting a coincidence signal of control data according to the first embodiment of the present invention.

Description is now made of a first embodiment of the present invention, with reference to FIG. 3 to FIG. 5. FIG. 3 is a configuration diagram of a control apparatus with a fast I/O function according to the present invention.

In FIG. 1, the control apparatus 1 includes a control program execution unit 1a, an I/O data interface unit 1b configured for interfacing, to and from an I/O device 2, input data from targets to be controlled and output signals such as to actuators for operating the targets to be controlled, and a system bus 19 configured for interconnection between the control program execution unit 1a and the I/O data interface unit 1b.

The control program execution unit 1a is configured with a control program executing circuit 14 adapted for execution of control operations of the control apparatus 1, a control program memory 15 adapted for storage of a control program to be executed, a control data memory 16 adapted for temporary storage of input data from the I/O device 2, as well as of output data, and for storage of control data that constitute control variables in execution of the control program, and a local bus 21 adapted for interconnection therebetween.

In other words, as used herein, the control data means whole data to be written or read to the control data memory 16, or constituting operands of objects of operations to be executed by the control program executing circuit 14.

The I/O data interface unit 1b is configured with an I/O interface 17 adapted for conversion such as of signals levels to be interfaced to and from the I/O device 2, and an I/O control circuit 20 adapted for controls of input data and output data to be interfaced to and from the control program execution unit 1a.

It is now noted that the local bus 21 may be omitted in a configuration where the control program executing circuit 14, control program memory 15, and control data memory 16 are directly connected to the system bus 19.

Description is now made of the control program executing circuit 14, with reference to FIG. 4 and FIG. 5. FIG. 4 is a configuration diagram of the control program executing circuit 14.

The control program executing circuit 14 is made up by an instruction register 148 for storing an instruction read from the control program memory 15, a decoder 149 for interpreting the instruction stored in the instruction register 148, an operation unit 141 for executing logical operations as well as numerical operations in accordance with the interpreted instruction, a control data storage register 144 for temporary storage of a control data read from the control data memory 16, a register 145 made by an operation result storage register 145a for temporary storage of a result of operation made by the operation unit 141 adapted for logical operations as well as numerical operations and a work register 145b for storage of a data to be operated, and a control data output register 144a for temporary storage of an output data of the operation unit 141.

It further includes a comparator 147 which is adapted for a comparison between the control data stored in the control data storage register 144 and a resultant data of an operation made by the operation unit 141 to detect whether or not a content of the control data constituting an operand of the operation is changed after execution of the operation from therebefore, and an operation controller 142 which is made up by a bus control circuit 142a and an operation control circuit 142b, and is adapted for controls to transfer the operand read from the control data memory 16 to the control data storage register 144, and to write the output data of the operation unit 141 from the register 145 via the control data output register 144a to the control data memory 16 in dependence on presence or absence of a coincidence signal from the comparator 147.

Description is now made of actions of the control program executing circuit 14, with reference to FIG. 5, where designated by IF is an instruction fetch action, RD is a data read action, and WD is a data write action.

FIG. 5(a) illustrates actions for a case in which a comparison is made by the comparator 147 between a control data stored in the control data storage register 144 and a resultant data of an operation made by this operand by the operation unit 141, without detection of a coincidence signal.

In this case, actions are sequentially executed, as a fetch (IF) of an instruction, and a reading (RD) of a control data thereof, and further up to a writing (WD) of the read control data to the control data memory 16.

In the case a coincidence signal is detected, no change is found between the control data stored in the control data storage register 144 and an operation output of the operation unit 141, and as illustrated by FIG. 5(b), after the control data is read, the operation controller 142 effects a control to omit an execution cycle of the writing (WD) so as not to execute a write instruction to the control data memory 16.

Therefore, among those data read from the control data memory 16 and stored in the control data storage register 144, if such operands of instructions as to be written again to the control data memory 16 are not changed in resultant data of operations made by the operation unit 141, there are allowed alterations to a sequence of instructions omitting their write instructions, whereby such intervals of time that otherwise might have been required for unnecessary write instructions can be cut, thus allowing for a shortened time for operations in the control apparatus.

Second Embodiment

Description is now made of a second embodiment of the present invention, with reference to FIG. 6 to FIG. 11. In the second embodiment, like parts to those in the control apparatus 1 of the first embodiment are designated by like reference characters, omitting redundancy.

In the first embodiment, among control data associated with execution by the control program executing circuit 14, only in case where, for all operands that involve occurrences of read and write to the control data memory 16, data coincidence between before and after operation is to occur, the write is omitted. In the second embodiment, further, by a coincidence signal between control data before and after an operation, a control is made of transfer from the control data memory 16 to the I/O data interface unit 1b and I/O device 2, so as to transfer simply the point where the output data is changed, thereby allowing for a shortened transfer time of output data.

Figure 6:
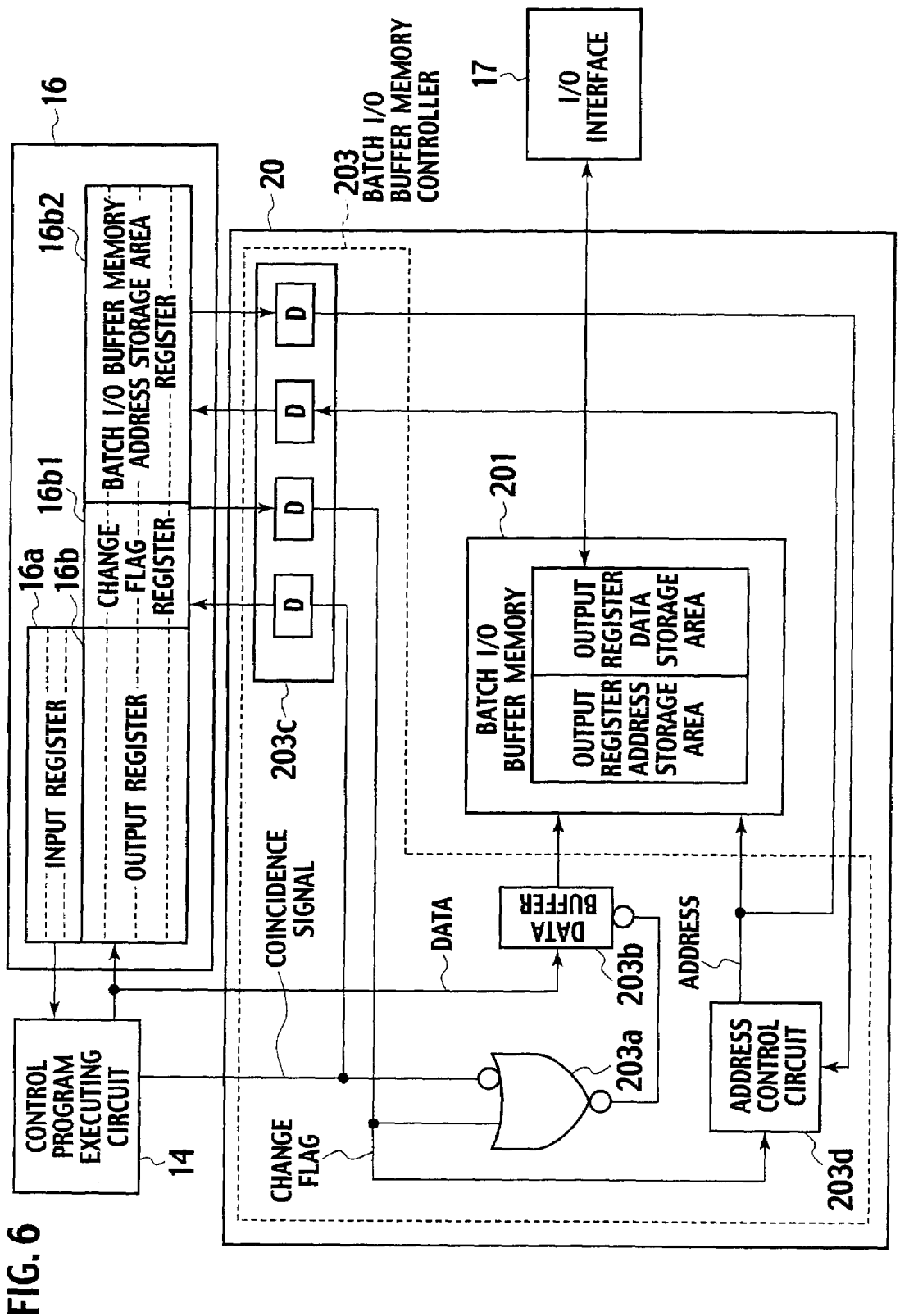
FIG. 6 is a configuration diagram describing a transfer of output data according to a second embodiment of the present invention.
Figure 7:
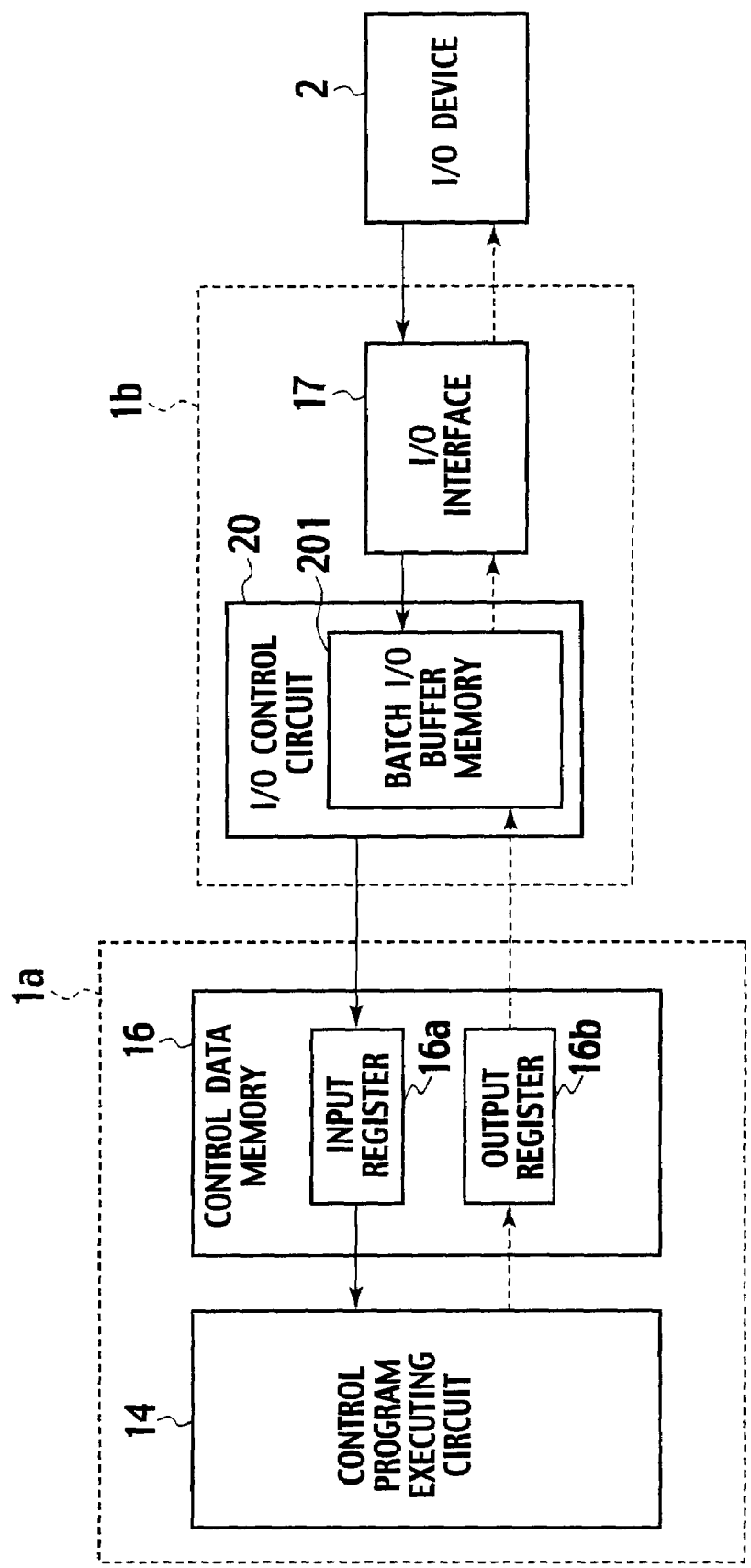
FIG. 7 is an explanatory diagram of flows of data in a batch I/O of the control apparatus according to the present invention.

FIG. 6 shows a configuration of the second embodiment. Description is first made of flows of input data and output data, with reference to FIG. 7. A data that indicates a status of an unshown target to be controlled is input, as shown by arrows of solid line, from an I/O device 2 to an I/O interface 17, and then from the I/O interface 17 to a batch I/O buffer memory 201 of an I/O control circuit 20, where it is stored, and from the batch I/O buffer memory 201 to an input register 16a of a control data memory 16, where it is stored by a prescribed control period determined in advance.

Further, as shown by arrows of broken line, an output data is operated in a control program executing circuit 14, and is stored in an output register 16b of the control data memory 16, which is then stored in the batch I/O buffer memory 201 of the I/O control circuit 20 by a prescribed control period determined in advance, and further is output from the batch I/O buffer memory 201 via the I/O interface 17 to the I/O device 2.

In the second embodiment, the I/O control circuit 20 is configured so that the output data to be transmitted from the output register 16b of the control data memory 16 has simply a point thereof, where this current transmission data is changed from a previous transmission data, selected and stored in the batch I/O buffer memory 201, and this output data stored in the batch I/O buffer memory 201 is output to the I/O interface 17 by a prescribed output period determined in advance.

Description is now made of a detailed configuration of the I/O control circuit 20, with reference to FIG. 6. The I/O control circuit 20 is configured with the batch I/O buffer memory 201 adapted for storage of an output data, and a batch I/O buffer memory controller 203 adapted to control, by presence or absence of a coincidence signal detected in the control program executing circuit 14, whether or not the output data is to be written in the batch I/O buffer memory 201.

In addition, the batch I/O buffer memory controller 203 is made up by a gate circuit 203a which receives a coincidence signal from the control program executing circuit 14 and controls, by its output, a storage of an output data output from the control program executing circuit 14, a data buffer 203b which is adapted for temporary storage of the output data, a data buffer 203c which buffers a change flag that indicates a changed state of this coincidence signal, i.e., whether or not an output data of a certain output register 16b is stored in the batch I/O buffer memory 201, and an address in the batch I/O buffer memory 201 of an output data when the coincidence signal is generated, and an address control circuit 203d which controls the address and data of the output data to be written in the batch I/O buffer memory 201.

The outputs from the data buffer memory 203c of an address in the batch I/O buffer memory 201 of this change flag and an output data upon occurrence of a coincidence signal are stored, as shown in FIG. 6, in a change flag register 16b1 and a batch I/O buffer memory address storage area register 16b2, respectively, in correspondence to the output register 16b of the control data memory 16.

Description is now made of control actions of the batch I/O buffer memory controller 203. In the batch I/O buffer memory controller 203, if the coincidence signal detected in the control program executing circuit 14 is not coincident, later-described states of actions are stored in the change flag register 16b1 and the batch I/O buffer memory address storage area register 16b2, in correspondence to the output data stored in the output register 16b of the control data memory 16.

FIG. 8 shows the states of the coincidence signal and write actions. In the case of detection of a coincidence signal "1", no write signals are output from the batch I/O buffer memory controller 203 to the change flag register 16b1 and the batch I/O buffer memory address storage area register 16b2.

To the contrary, in the case of detection of a coincidence signal "0", that is, in the case of non-coincidence, write signals are transmitted to respective registers.

FIG. 9 shows write actions of the batch I/O buffer memory 201 in this timing. The combination of states of coincidence signal and change flag has four states.

In an initial state where the coincidence signal is "0" and the change flag is "0", preset initial values are written in an output register address storage area and an output register data storage area.

Next, in the case where the coincidence signal is "0" and the change flag is "1", which indicates a change has occurred in the previous output data, the output register address storage area has extracted therein an address stored in the previous time in the batch I/O buffer memory address storage area register 16b2, and the extracted address is written from the address control circuit 202 to the batch I/O buffer memory 201.

Therefore, upon a change of output data at the first time, that is, besides the case of coincidence signal "0" and change flag "0", also in a case where an output data of a certain output register is updated a plurality of times during execution the program, having a data again changed, that is, in a state where the coincidence signal is "0" and the change flag is set "1", an address is written over an identical address of the batch I/O buffer memory 201 where it is written in the previous time.

In the case where the coincidence signal is "1" and the change flag is "0", and the case where the coincidence signal is "1" and the change flag is "1", that is, when the output data is coincident, having no changes from an output data in the previous time, then the batch I/O buffer memory 201 receives no writing from the address control circuit 202.

Description is made of the foregoing control actions, with reference to FIG. 10, where designated by IF is an instruction fetch action, RD is a data read action, and WD is a phase of data write action.

FIG. 10(a) illustrates states in which the control program executing circuit 14 has read a control program (s1), and executed a read control data (s2, s3, s4), resulting in detection of a coincidence signal (s5). In this case, as the coincidence signal is detected, the flow goes to the next program by this action.

FIG. 10(b) illustrates actions of the I/O control circuit 20 in a case where no coincidence signal is detected (s5).

In this case, as the operation result is different from the previous time, a change flag (s6) and an output register address storage area are read (s7) from the control data memory 16, and the read address is output from the address control circuit 202 to the batch I/O buffer memory 201 (s8), where data of the data buffer 203b is written (s9).

Figure 11:
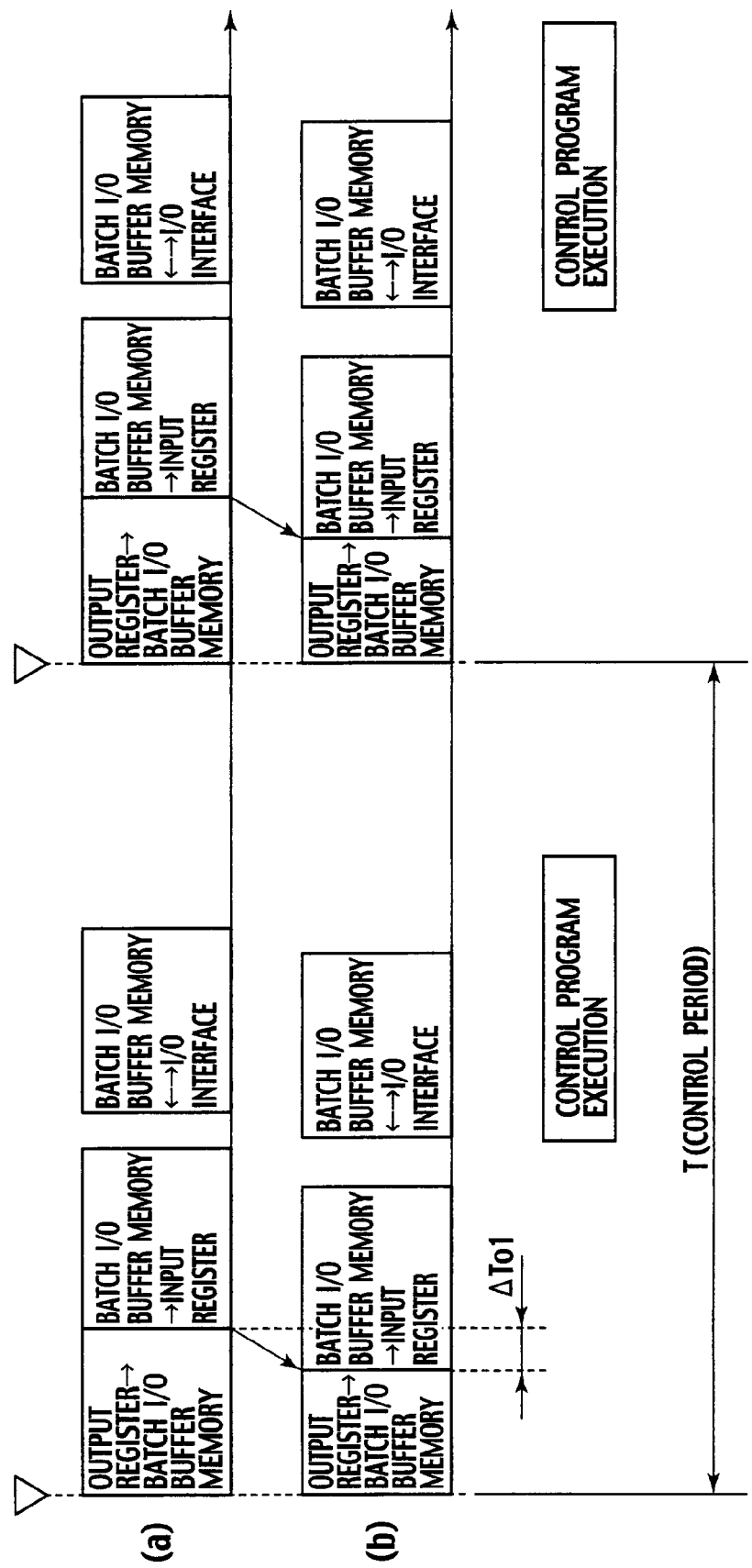
FIG. 11 is an explanatory diagram of effects of control actions according to the second embodiment of the present invention.

FIG. 11 illustrates a shortening effect of transfer time of input data in the present embodiment configured as described. For batch I/O actions, although in conventional actions, as illustrated in FIG. 11(a), all data are transferred from output registers to a batch I/O buffer memory, transfer is now made, as illustrated by FIG. 11(b), in a manner limited to output data of addresses changed from operation outputs in a previous control period, allowing for a reduction $\Delta\text{To1}$ of time corresponding to a reduced number of data.

Namely, it has become possible to output to the I/O device 2 no more than those control data of which contents are changed by operation, enabling a reduction of required time for batch I/O, allowing for provision of a control apparatus with a fast I/O function that has a reduced control period T.

It is noted that unshown control periods to be set in advance in a control program execution unit 1a or I/O data interface unit 1b may be synchronized identical control periods or asynchronous different control periods, so long as they are well short to provide controllability as necessary for targets to be controlled.

Third Embodiment

Figure 12:
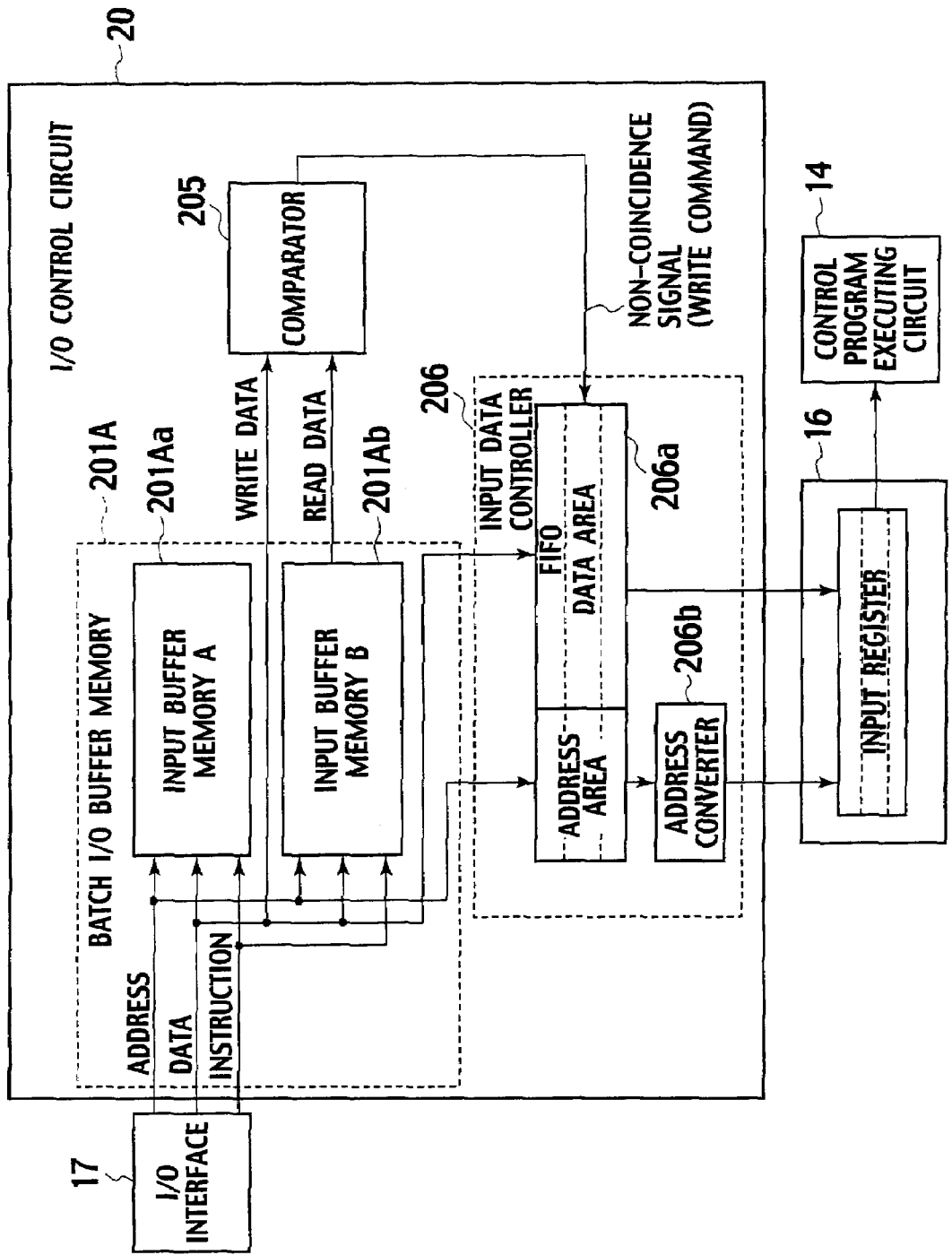
FIG. 12 is a configuration diagram describing a transfer of input data according to a third embodiment of the present invention.
Figure 13:
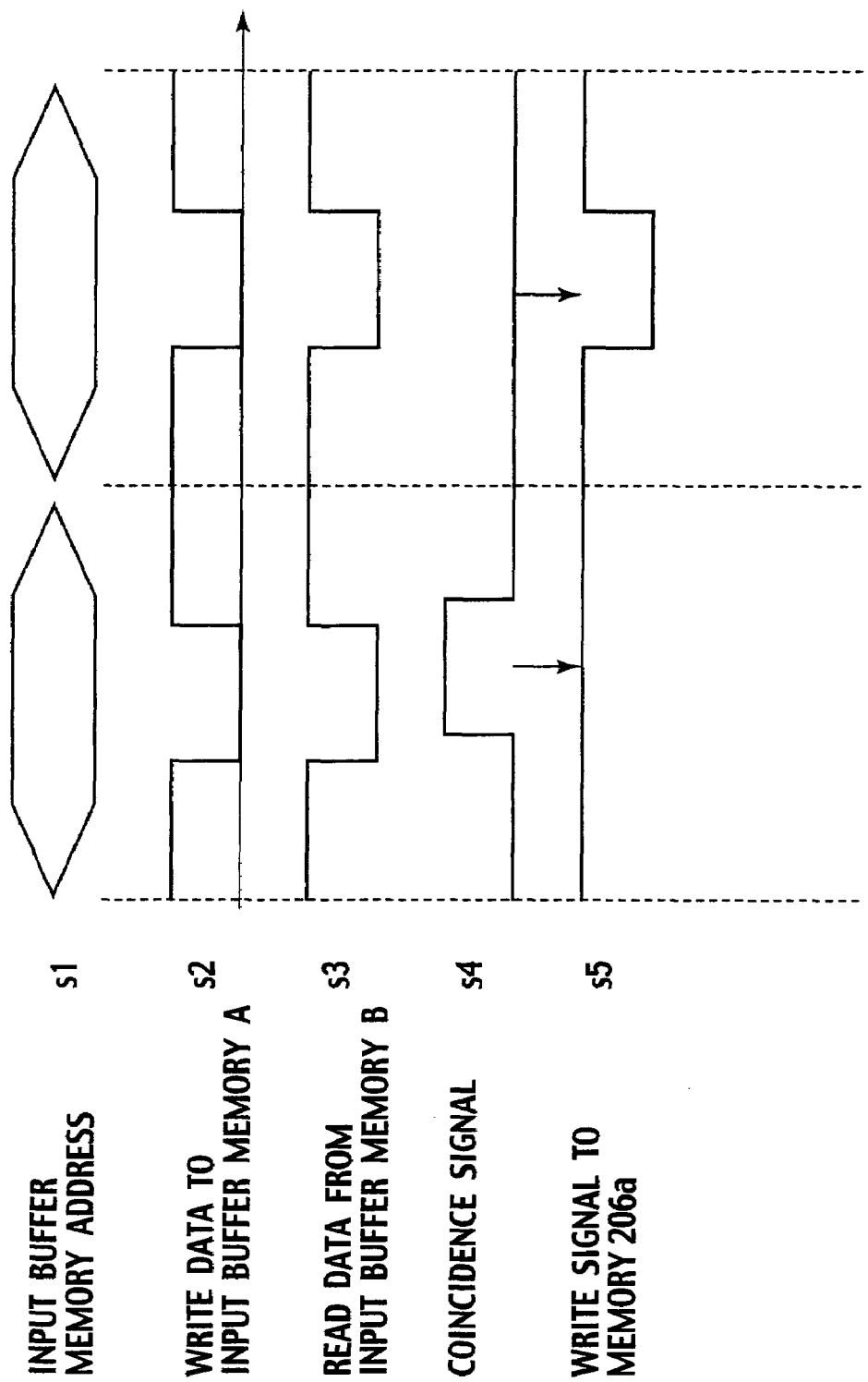
FIG. 13 is an explanatory diagram of transfer actions of input data according to the third embodiment of the present invention.
Figure 14:
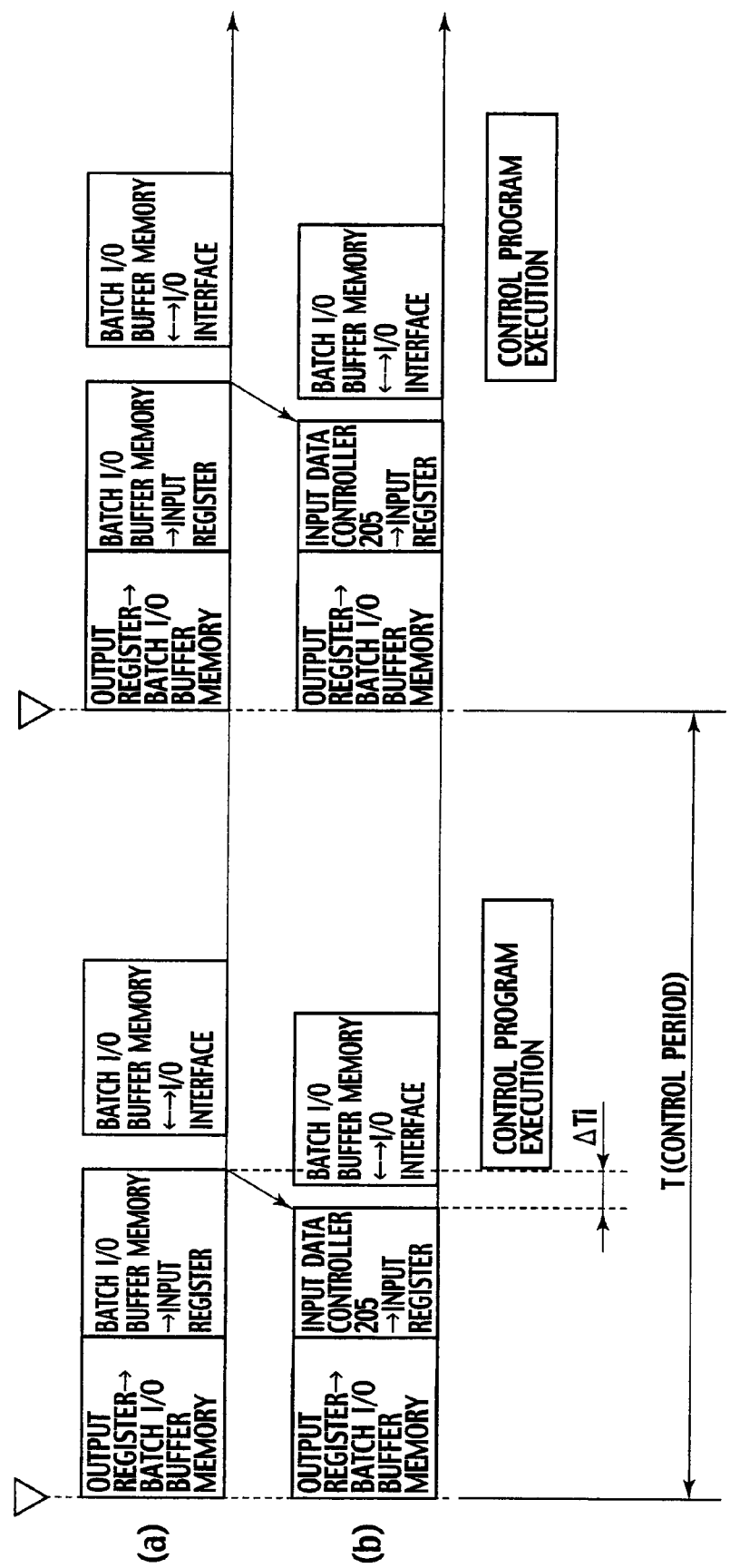
FIG. 14 is an explanatory diagram of effects of control actions according to the third embodiment of the present invention.

Description is now made of a third embodiment of the present invention, with reference to FIG. 12 to FIG. 14. In the third embodiment, like parts to those in the control apparatus 1 of the first embodiment shown in FIG. 3 to FIG. 5 are designated by like reference characters, omitting redundancy.

In the second embodiment, presence or absence of coincidence is detected between an operand before an operation of an instruction sequence and a data after the operation to control the transfer of the data from the control data memory 16 to the I/O data interface unit 1b and I/O device 2 and transfer only changed points of the output data thereto, allowing for a reduced transfer time of output data. In the third embodiment, a comparison is made between an input data of a previous time and an input data of a current time, for a transfer to be made simply of changed input data among whole input data to be transferred to the control data memory 16 from the I/O control circuit 20 shown by solid lines in FIG. 7, thereby allowing for a reduced transfer time.

FIG. 12 shows a configuration of the third embodiment. In the third embodiment, an I/O control circuit 20 is configured with a batch I/O buffer memory 201A adapted for input data transmitted from an I/O interface 17 to have an input data upon execution of program in a previous control period and an input data upon execution of program in a current control period alternately stored in different memories, a comparator 205 adapted for a comparison between the current input data and the previous input data, and an input data controller 206 adapted for temporary storage of input data to be transferred to the control data memory 16 in accordance with presence or absence of a coincidence signal of the comparator 205.

Description is now made of a detailed configuration of the I/O control circuit 20. The batch I/O buffer memory 201A is made up by a pair of input buffer memory A 201Aa and input buffer memory B 201Ab to be connected address and data of input data transmitted from the I/O interface 17, as they are adapted to be switched by instructions to alternately receive inputs by a preset control period.

The comparator 205 is adapted to read for comparison an input data to be written to either input buffer memory in the current time and an input data written there in the previous time, and output a coincidence signal to an input data controller 206 when the input data coincide with each other.

The input data controller 206 is made up by a memory 206a of a FIFO (First In First Out) system for sequentially storing input data transmitted from the I/O interface 17, having their addresses and data in a corresponding manner, and an address converter 206b for converting an address data to be stored in the memory 206a to a write address of the control data memory 16.

The input data controller 206 is adapted to have input data stored in the memory 206a when the comparator 205 is non-coincident, and no more than a non-coincident input data is transferred to the control data memory 16 by a prescribed control period.

FIG. 13 shows a time chart of such actions. In the case where a write data (s2) to the input buffer memory A 201Aa and a read data (s3) from the input buffer memory B 201Ab are non-coincident (s4), a write signal (s5) is output from the comparator 205 to the memory 206a, where the input data is written.

FIG. 14 illustrates a shortening effect of transfer time of input data in the present embodiment configured as described. Relative to transfer actions within a control period T of whole I/O data in a batch I/O illustrated in FIG. 14(a), transfer is now made, as illustrated by FIG. 14(b), simply of changed input data via the I/O data controller 206 to the control data memory 16, allowing for a reduction ΔTi of transfer time in comparison with a conventional transfer of all input data from a batch I/O buffer memory.

Fourth Embodiment

Figure 15:
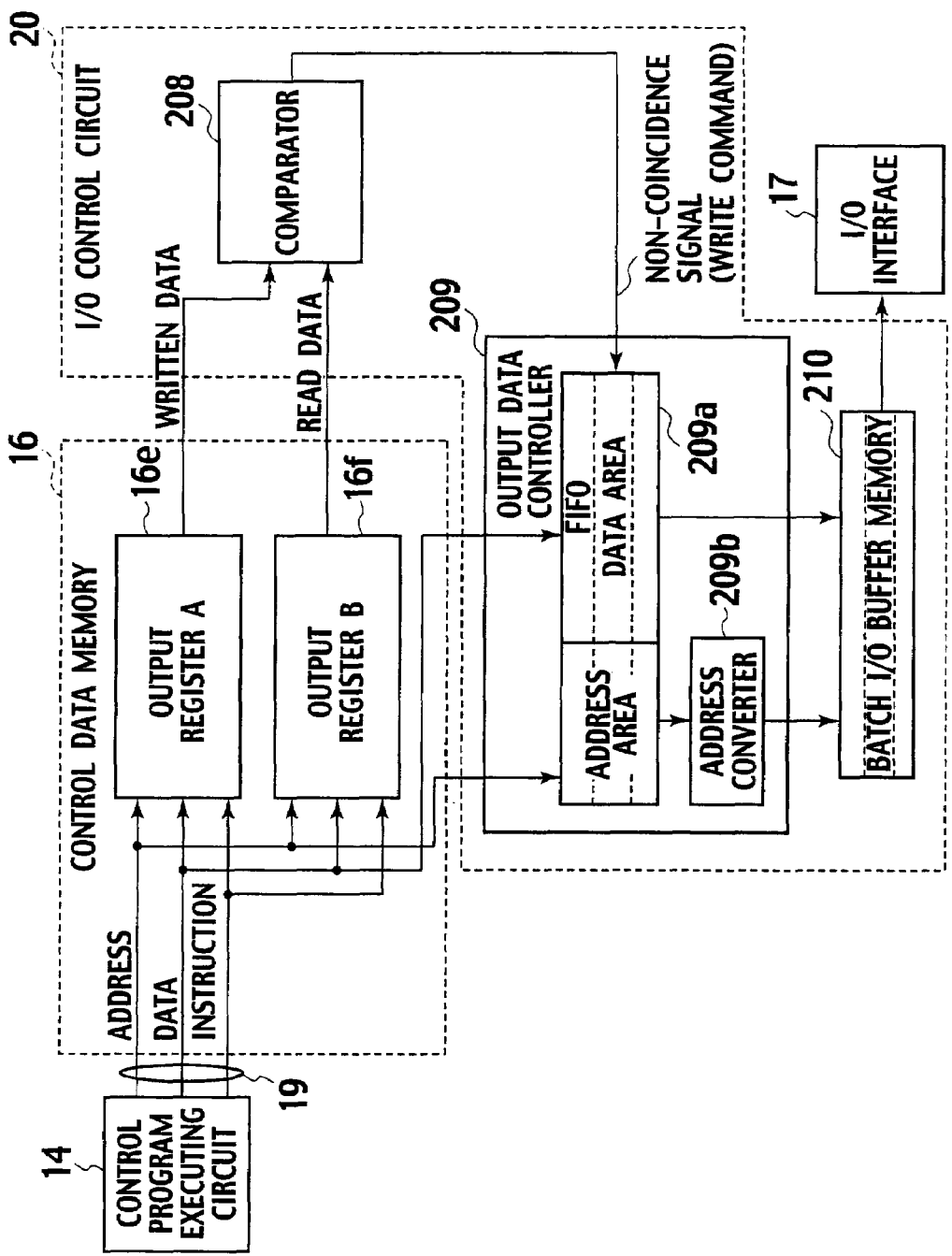
FIG. 15 is a configuration diagram describing a transfer of output data according to a fourth embodiment of the present invention.
Figure 16:
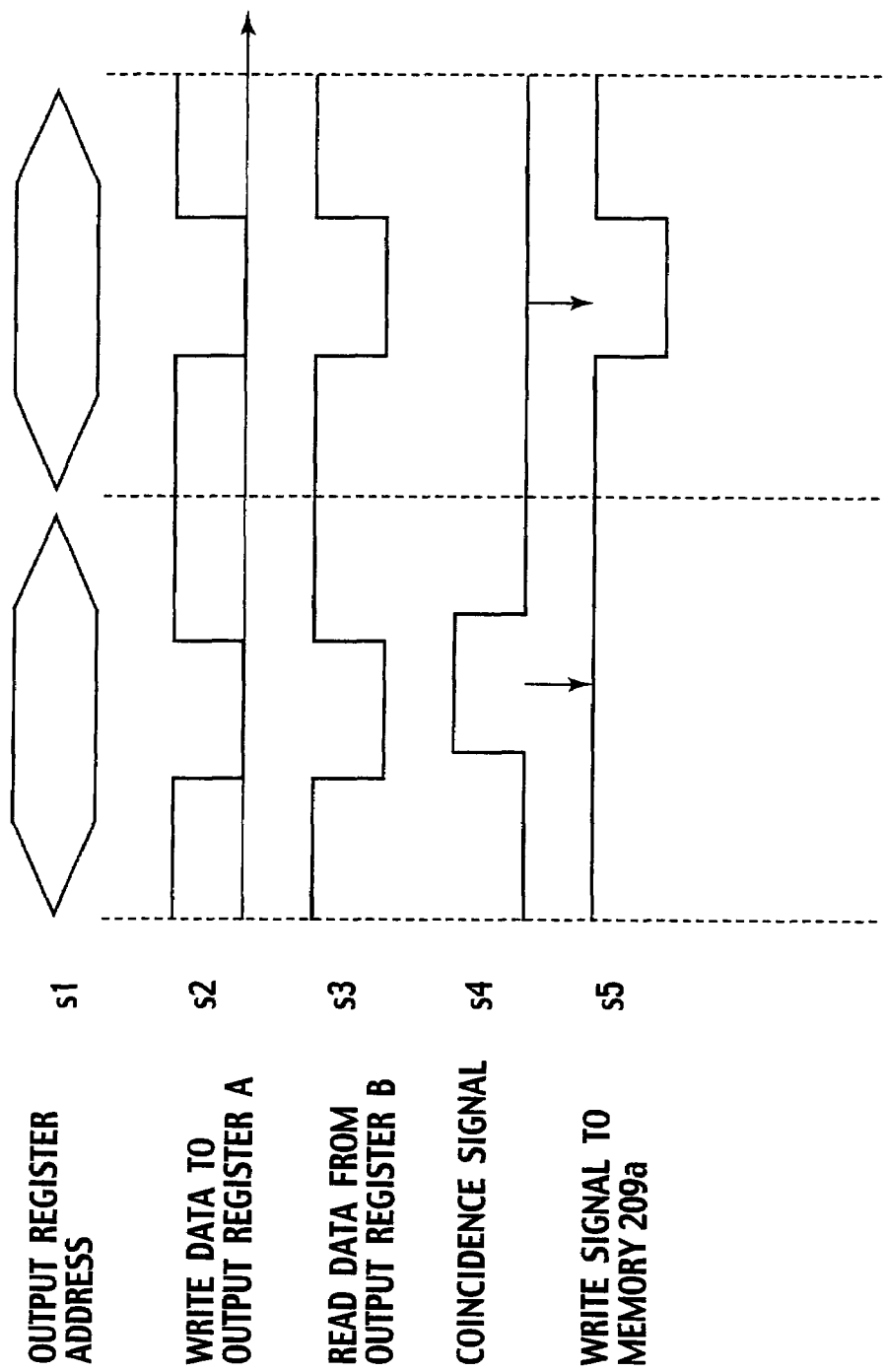
FIG. 16 is an explanatory diagram of transfer actions of output data according to the fourth embodiment of the present invention.

Description is now made of a fourth embodiment of the present invention, with reference to FIG. 15 to FIG. 17. In the fourth embodiment, like parts to those in the control apparatus 1 of the first embodiment shown in FIG. 3 to FIG. 5 are designated by like reference characters, omitting redundancy.

In the third embodiment, by a coincidence signal taken between a control data before an operation and a data after the operation, the data transfer from the control data memory 16 to the I/O data interface unit 1b and I/O device 2 is controlled to transfer only changed points in the output data, allowing for a reduced transfer time of output data. In the fourth embodiment, a result of control operation in a previous control period and a result of control operation in a current control period of a control program executing circuit 14 are stored in a pair of output registers adapted for alternate storage, and a comparison is made between the previous operation result and the current operation result, to write simply non-coincident output data to an output buffer memory, so that a transfer from a control data memory 16 to an I/O device 2 is made simple.

FIG. 15 shows a configuration of the fourth embodiment. In the fourth embodiment, the control data memory 16 is configured with a pair of output register 16e and output register 16f adapted for alternately storing by control periods a control operation output of the control program executing circuit 14 via a system bus 19.

It is now assumed that description is made of the case where a bus system to be configured with the system bus 19 and a local bus 21 is made up simply by the system bus 19.

An I/O control circuit 20 is configured with a comparator 208 adapted to read, and for a comparison between, an input data written in a current time to either output register and an output data written by a control period in a previous time to the other output register, an output data controller 209 adapted for temporary storage of output data judged by an output of the comparator 208, as being changed from an output in the control period of the previous time, and a batch I/O buffer memory 210 adapted for storage of output data stored in the output data controller 209.

Description is now made of a detailed configuration of the output data controller 209. The output data controller 209 is made up by a memory 209a of a FIFO system for storing addresses and data of output data of the current time that correspond to the case where output data stored by preset control periods in the output register 16e and the output register 16f are judged by an output of the comparator 208 so that current output data and previous output data are different (non-coincident) from each other, and an address converter 209b for converting address data to be stored in the memory 209a to addresses of the batch I/O buffer memory 210.

In other words, in the case where the comparator 208a has a non-coincident output, output data in the memory 209a are written to the batch I/O buffer memory 210, so that simply non-coincident output data are transferred from the control data memory 16 to the I/O control circuit by a prescribed control period.

FIG. 16 shows a time chart of such actions. In the case where a write data (s2) to the output register 16e and a read data (s3) from the output register 16b are compared by the comparator 208, and the coincidence signal (s4) is non-coincident, a write signal (s5) is output to the memory 209a, so that the output data is written in the batch I/O buffer memory 210.

FIG. 17 illustrates a shortening effect of transfer time of output data in the fourth embodiment configured as described. Relative to transfer actions within a control period T of whole I/O data in a batch I/O illustrated in FIG. 17(a), transfer is now made, as illustrated by FIG. 17(b), simply of changed output data from the output registers of the control data memory 16 to the batch I/O buffer memory 210, allowing for a reduction ΔTo2 of transfer time.

While preferred embodiments of the present invention have been described using specific terms, such description is for illustrative purposes, and it is to be understood that changes and variations may be made without departing from the spirit or scope of the following claims.

What is claimed is:

1. A control apparatus with a fast I/O function, the control apparatus being adapted for storage of a control program, and to input a status of a target to be controlled as an input data from an I/O device, follow the control program to execute an operation of the input data, and output to the I/O device a result of the operation as an output data for controlling the target to be controlled, the control apparatus comprising:
　a control program execution unit for controlling the target to be controlled;
　an I/O data interface unit for having the input data input to the control apparatus and the output data output to the I/O device; and
　a system bus for interconnection between the control program execution unit and the I/O data interface unit, the control program execution unit comprising:
　a control program memory adapted for storage of the control program;
　a control data memory adapted for temporary storage of the input data, the output data, and a control variable; and
　a control program executing circuit adapted for execution of the control program by using the input data to be stored in the control data memory, the control program executing circuit comprising:
　an instruction register for storing an instruction read from the control program memory;
　a decoder for interpreting the instruction stored in the instruction register;
　a control data storage register for storing a content of an operand read from the control data memory;
　an operation unit for operating a control data stored in the control data storage register in accordance with the instruction interpreted by the decoder;
　a register for storing an operation output of the operation unit;
　a control data comparator for detecting whether or not a coincidence is found between the control data before operation by the operation unit and a data after execution of operation; and
　an operation controller adapted for controls to have the operand read from the control data memory to the control data storage register, and an output data from the operation unit written in the control data memory in accordance with an output of the control data comparator, wherein the operation controller controls a write phase of a read and write instruction to be omitted if a coincidence signal is output from the control data comparator, and otherwise an entirety of the read and write instruction to be executed.

2. The control apparatus with a fast I/O function as claimed in claim 1, wherein the I/O data interface unit comprises:
　a batch I/O buffer memory having an I/O data register adapted for storage of an output data of the I/O device; and
　a batch I/O buffer memory controller for a control of writing to the batch I/O buffer memory,
　the batch I/O buffer memory controller being adapted, if the coincidence signal is output from the control data comparator of the control program executing circuit, to stop writing an output data of the control data memory to the batch I/O buffer memory, and otherwise to allow the writing to the batch I/O buffer memory.

3. The control apparatus with a fast I/O function as claimed in claim 1, wherein the I/O data interface unit comprises:
　a combination of a first buffer memory and a second buffer memory adapted for alternate storage of an input data read from the I/O device in a current control period or a previous control period;
　an input data comparator adapted for comparison between an input data to be stored in the first buffer memory and an input data stored in the second buffer memory; and
　an input data controller adapted, if a coincidence output is given by the input data comparator, then to provide an instruction not to write the input data in the current control period to the control data memory, and otherwise to provide an instruction to write.

4. The control apparatus with a fast I/O function as claimed in claim 3, wherein the input data controller comprises an address converter for converting an address of the input data to a write address of an input register of the control data memory.

5. The control apparatus with a fast I/O function as claimed in claim 1, wherein the I/O data interface unit comprises:
　the control data memory having a combination of a first output register and a second output register adapted for storage of an output data read in a current control period or a previous control period to be output to the I/O device;
　a output data comparator adapted for comparison between an output data stored in the first output register and an output data stored in the second output register;
　an output buffer memory adapted for storage of an output data to be output to the I/O device; and
　an output data controller adapted, if a coincidence output is given by the output data comparator, to provide an instruction not to write the output data in the current control period to the output buffer memory, and otherwise to provide an instruction to write.

* * * * *